US006078340A

United States Patent [19]

Jeanmaire et al.

[11] Patent Number: 6,078,340

[45] Date of Patent: Jun. 20, 2000

[54] USING SILVER SALTS AND REDUCING REAGENTS IN MICROFLUIDIC PRINTING

[75] Inventors: David L. Jeanmaire, Brockport; Xin Wen, Rochester, both of N.Y.

[73] Assignee: Eastman Kodak Company, Rochester, N.Y.

[21] Appl. No.: 09/018,151

[22] Filed: Feb. 3, 1998

Related U.S. Application Data

[60] Provisional application No. 60/060,120, Sep. 26, 1997.

[51] Int. Cl.[7] .......... G01D 9/00

[52] U.S. Cl. .......... 346/140.1; 347/7

[58] Field of Search .......... 346/140.1; 347/6, 347/85, 7, 100, 96, 103

[56] References Cited

U.S. PATENT DOCUMENTS

| | | |
|---|---|---|
| 5,178,190 | 1/1993 | Mettner . |
| 5,238,223 | 8/1993 | Mettner et al. . |
| 5,259,737 | 11/1993 | Kamisuki et al. . |
| 5,367,878 | 11/1994 | Muntz et al. . |
| 5,400,824 | 3/1995 | Gschwendtner et al. . |
| 5,585,069 | 12/1996 | Zanzucchi et al. . |
| 5,593,838 | 1/1997 | Zanzucchi et al. . |
| 5,603,351 | 2/1997 | Cherukuri et al. . |
| 5,621,449 | 4/1997 | Leenders et al. .......... 347/96 |
| 5,771,810 | 6/1998 | Wolcott .......... 346/140.1 |

OTHER PUBLICATIONS

Dasgupta et al., see "Electroosmosis: A Reliable Fluid Propulsion System for Flow Injection Analyses", Anal. Chem. 66, pp. 1792–1798 (1994).

p. 26 Sensor, Sep., 1994: "Understanding Microwave Technology", H. Jerman & M. Dunbar.

*Primary Examiner*—N. Le
*Assistant Examiner*—Lamson D. Nguyen
*Attorney, Agent, or Firm*—Raymond L. Owens

[57] ABSTRACT

A method for microfluidic printing of black images on a receiver, including providing a reservoir containing a reagent capable of reducing a silver salt to silver metal; providing a reservoir containing a silver salt; reacting the reducing agent with the silver salt to provide black pixels; and transferring the black pixels to a receiver.

6 Claims, 4 Drawing Sheets

USING SILVER SALTS AND REDUCING REAGENTS IN MICROFLUIDIC PRINTING

CROSS REFERENCE TO RELATED APPLICATION

Reference is made to and priority claimed from U.S. Provisional Application Ser. No. 60/060,120, filed Sep. 26, 1997, entitled USING SILVER SALTS AND REDUCING AGENTS IN MICROFLUIDIC PRINTING.

CROSS REFERENCE TO RELATED APPLICATIONS

Reference is made to commonly assigned U.S. patent application Ser. No. 08/868,426, filed Jun. 3, 1997 entitled "Continuous Tone Microfluidic Printing"; U.S. patent application Ser. No. 08/868,104, filed Jun. 3, 1997 entitled "Image Producing Apparatus for Microfluidic Printing"; U.S. patent application Ser. No. 08/868,100, filed Jun. 3, 1997 entitled "Improved Image Producing Apparatus for Uniform Microfluidic Printing"; U.S. patent application Ser. No. 08/868,416, filed Jun. 3, 1997 entitled "Microfluidic Printing on Receiver"; U.S. patent application Ser. No. 08/868,102, filed Jun. 3, 1997 entitled "Microfluidic Printing With Ink Volume Control"; and U.S. patent application Ser. No. 08/868,477, filed Jun. 3, 1997 entitled "Microfluidic Printing With Ink Flow Regulation". The disclosure of these related applications is incorporated herein by reference.

FIELD OF THE INVENTION

The present invention relates to printing digital images by microfluidic printing of monochrome images formed by chemical reactions.

BACKGROUND OF THE INVENTION

Microfluidic pumping and dispensing of liquid chemical reagents is the subject of three U.S. Pat. Nos. 5,585,069; 5,593,838; and 5,603,351, all assigned to the David Sarnoff Research Center, Inc. The system uses an array of micron sized reservoirs, with connecting microchannels and reaction cells etched into a substrate. Electrokinetic pumps comprising electrically activated electrodes within the microchannels proved the propulsive forces to move the liquid reagents within the system. One class of electrokinetic pump, which is known as an electroosmotic pump, has been disclosed by Dasgupta et al., see "Electroosmosis: A Reliable Fluid Propulsion System for Flow Injection Analyses", Anal. Chem. 66, pp 1792–1798 (1994). The chemical reagent solutions are pumped from a reservoir, mixed in controlled amounts, and then pumped into a bottom array of reaction cells. The array may be decoupled from the assembly and removed for incubation or analysis.

The above described microfluidic pumping can be used as a printing apparatus. The chemical reagent solutions are replaced by dispersions or solutions of ink colorants. The array of reaction cells may be considered a viewable display of picture elements, or pixels, comprising mixtures of colorants having the hue of the pixel in the original scene. When contacted with the paper, the force of the paper fibers pulls the colorant from the cells and holds it in the paper, thus producing a paper print, or photograph, of the original scene.

One problem with microfluidic printing is in the excess amount of fluid being transferred to the receiving medium during printing. The reducing solution and inks can be aqueous or organic solutions or aqueous or organic dispersions. In the case of solutions, to avoid precipitation or phase separation, the concentrations of the inks are required to be below the solubility limits of the inks in the respective carrier solvent. For pigments, the concentration is dependent on the stability of the dispersion to prevent coalescence of the dispersed particulate. Typically, the concentrations for the colorant and the pigmented inks are below 10 wt % and 15 wt % respectively. Thus, for transferring a fixed amount of colorant to a receiving medium as required by the image, a large amount of carrier solvent needs also to be absorbed by the receiving medium. This increases the ink absorbing materials to be coated on the receiver as well as the cost of the receiver. It also increases the time for the inks to dry on a receiving medium after printing.

SUMMARY OF THE INVENTION

An object of this invention is to provide high quality microfluidic printing which is capable of providing high-density continuous-tone black images.

This object is achieved by a method for microfluidic printing of black images on a receiver, comprising the steps of:

a) providing a reservoir containing a reagent capable of reducing a silver salt to silver metal;

b) providing a reservoir containing a silver salt;

c) reacting the reducing agent with the silver salt to provide black pixels; and d) transferring the black pixels to a receiver.

Features of the present invention are that it can produce black images having a high density, and that it is capable of gray-scale printing.

DETAILED DESCRIPTION OF THE INVENTION

The present invention is described in relation to a microfluidic printing apparatus which can print computer generated images, graphic images, line art, text images and the like, as well as continuous tone images.

Figure 1:
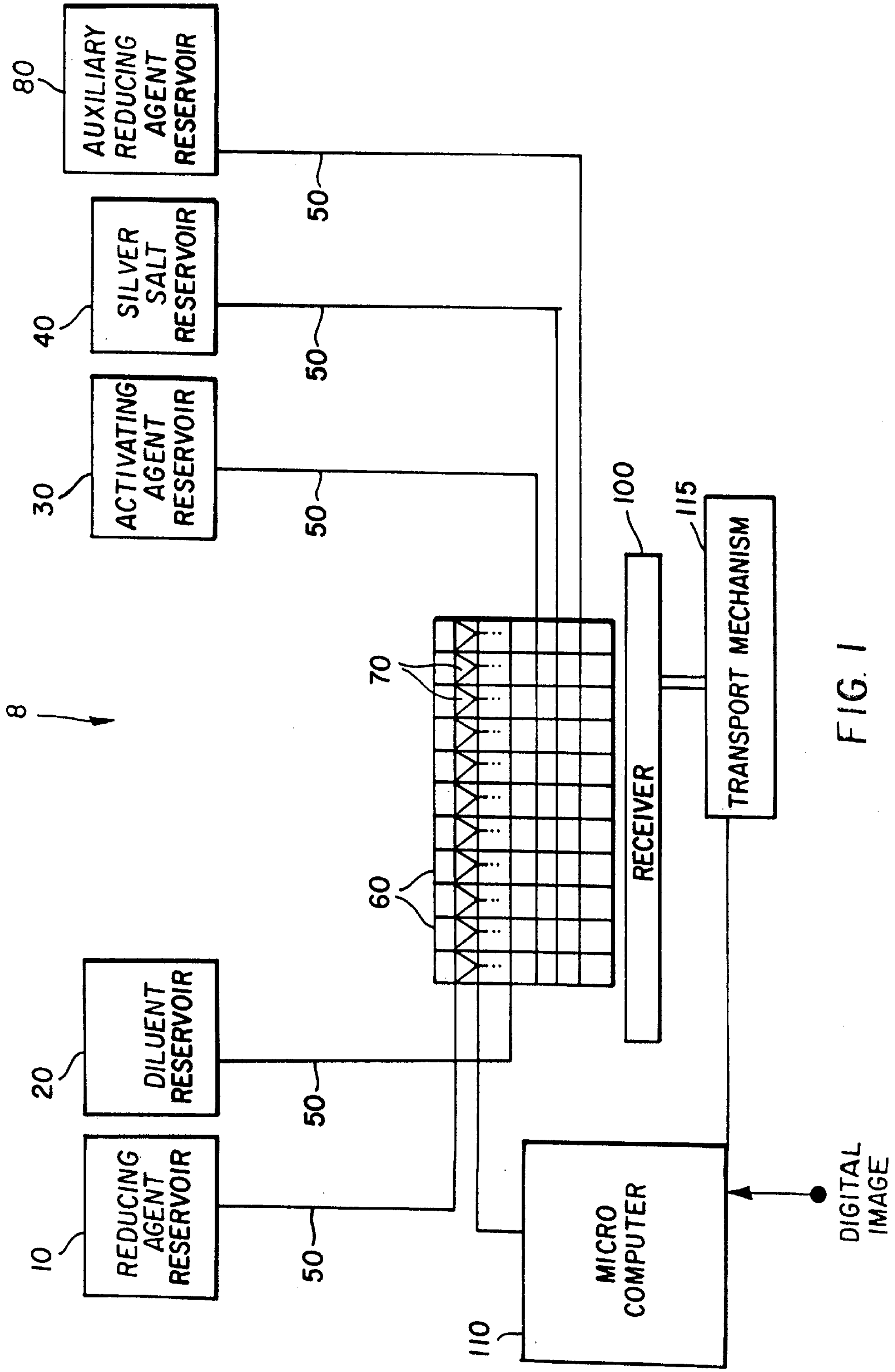
FIG. 1 is a partial schematic showing an apparatus for pumping the reducing agent, diluent and silver-containing solution, reacting them in a mixing chamber and printing onto a receiver.
Figure 3:
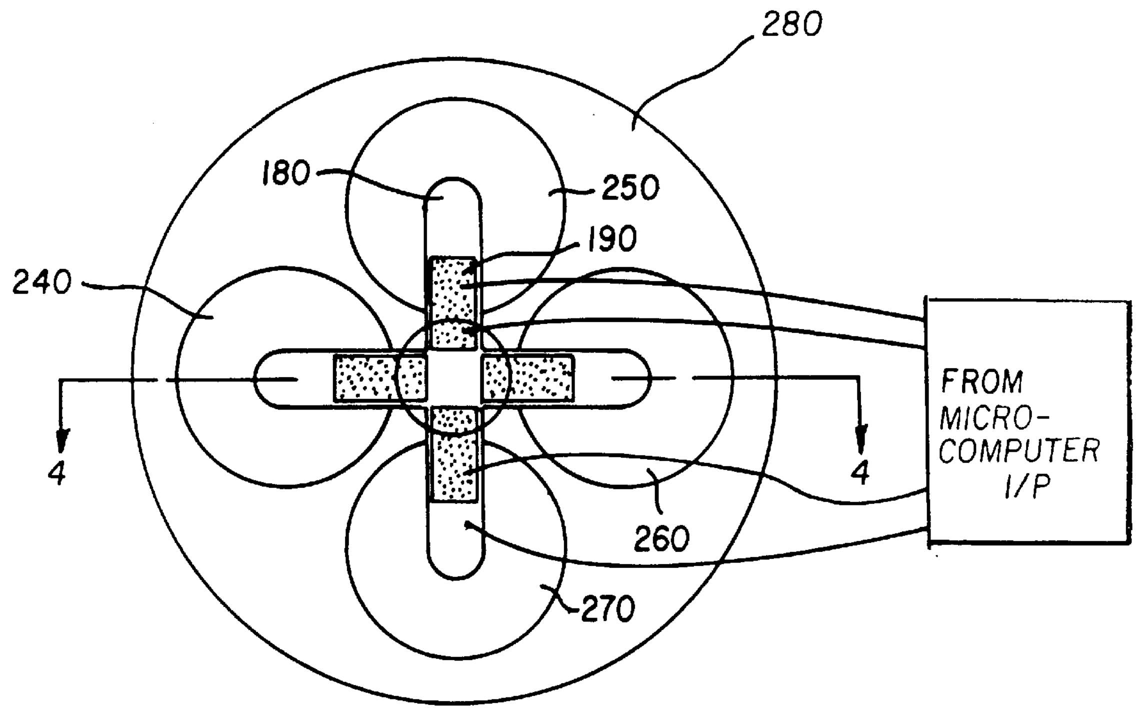
FIG. 3 is a detailed plan view of mixing chambers of the microfluidic printing apparatus in the present invention.
Figure 4:
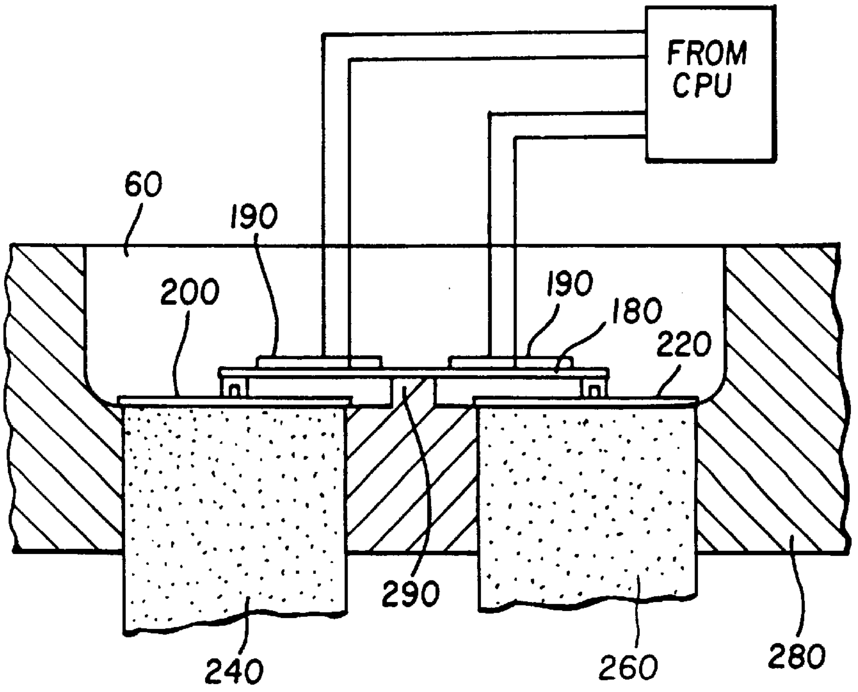
FIG. 4 is a cross-sectional view taken along the lines 4—4 of FIG. 3 and showing closed microvalves.
Figure 5:
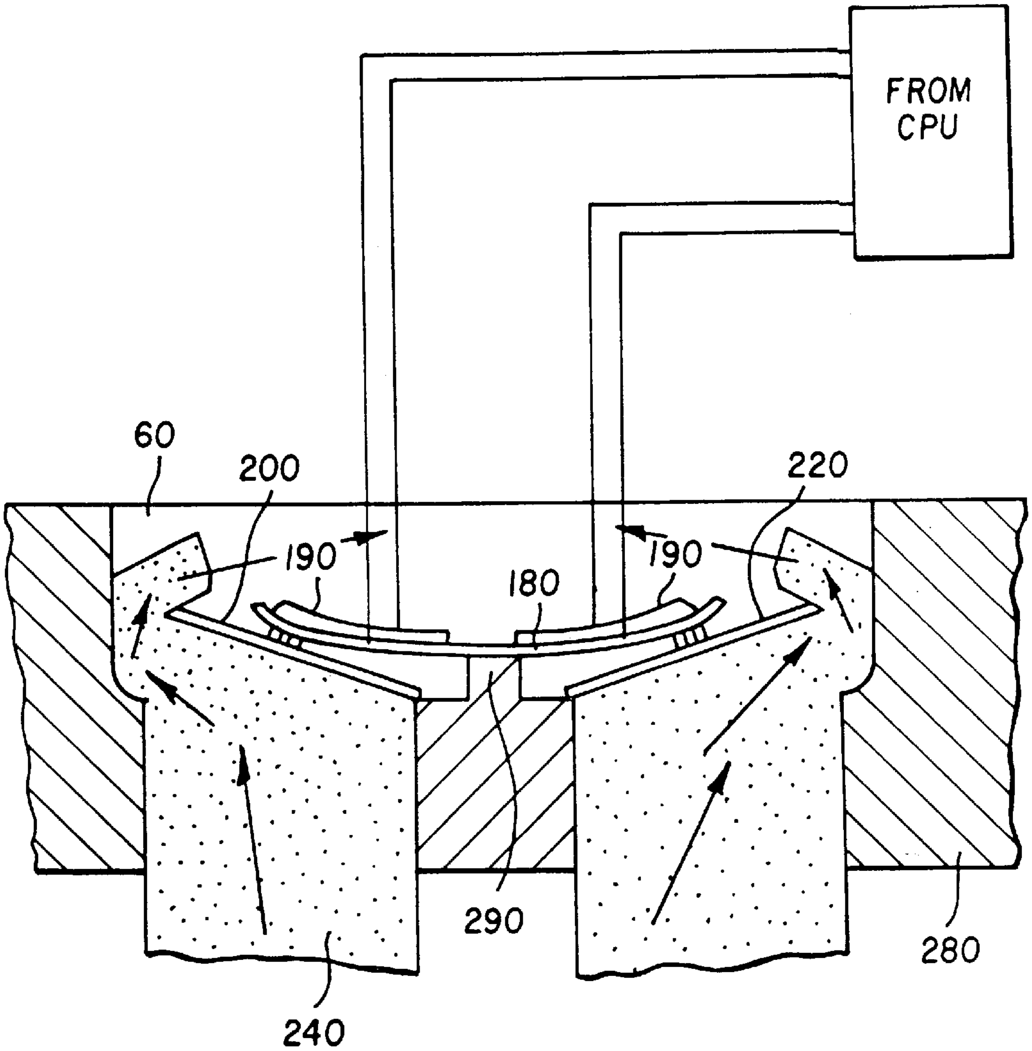
FIG. 5 is a cross-sectional view similar to that of FIG. 4 with the microvalves shown in the open position.

Referring to FIG. 1, a schematic diagram is shown of the method of printing. Reservoir 10 is shown for the reducing agent. Reservoirs 20 and 30 are for diluents and activating agents, respectively. Reservoir 40 holds silver salt. More reservoirs can be added to expand the printing capabilities, for example by adding a reservoir 80 to contain a secondary, or less active, silver reducing agent. Microchannels 50 are shown to conduct reagents and inks from the respective reservoirs to the mixing chambers 60. The amounts of reducing agent, solvent, and silver-containing ink delivered are controlled by electrokinetic pumps 70, which are only shown for the reducing-agent channel. A microcomputer 110, in response to a digital image, controls the operation of the electrokinetic pump 70 to deliver appropriate amounts of material from the different reservoirs where they are mixed. The microcomputer 110 also controls the operation of a transport mechanism 115 which adjusts a receiver 100 to be in a printing relationship with the mixing chambers 60. For further discussion of the operation of these elements, see the above identified patent applications referred to in the section entitled Cross Reference to Related Applications. Similar pumps are used for the solvent and silver-ink channels, which are shown in FIGS. 3–5, but are omitted from this figure for clarity. Black printing densities are controlled by the ratios of the reducing agent, the silver-based ink and the solvent diluent metered to the chamber. Finally, a reflective receiver 100 is shown to accept black pixels formed in the mixing chambers by the chemical reactions and thereby produce the print. It is an important feature of the invention that the reaction of the reducing agent with the silver salt provides black pixels in the mixing chambers which are transferred to the receiver. By adding in the appropriate amount of the diluent, the present invention is capable of providing black pixels having the desired density. Although a reflective receiver is described in this embodiment, it will be understood that other receivers, such as those which have transparent supports, can be used.

Figure 2:
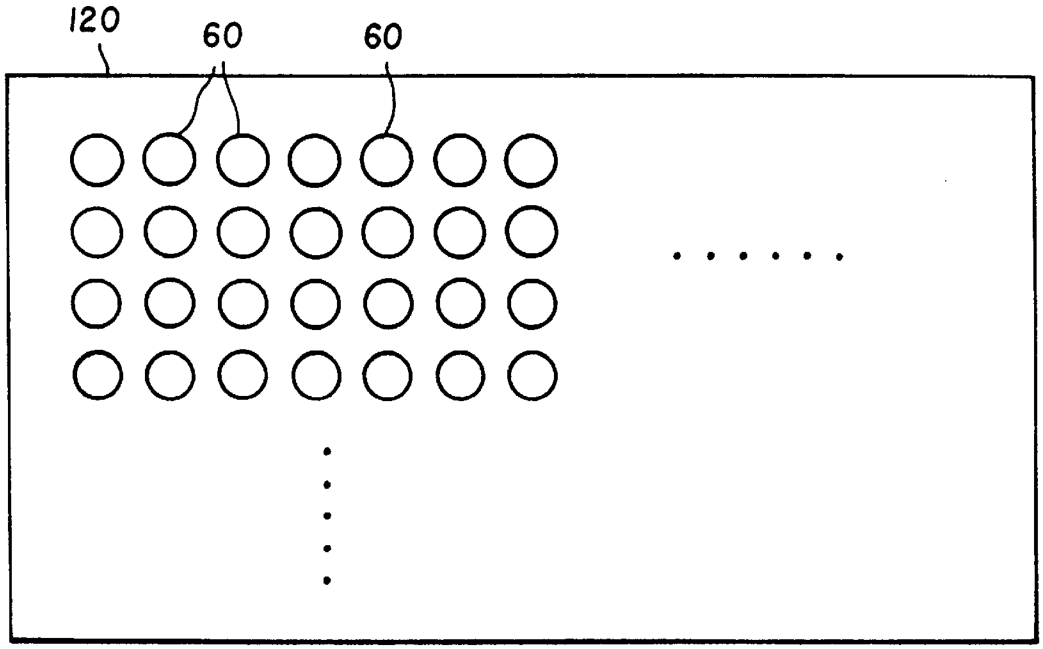
FIG. 2 is a top view of the print head as described in the present invention.

FIG. 2 depicts a top view of the arrangement of mixing chambers 60 shown in FIG. 1. Each mixing chamber 60 is capable of producing reagents sufficient to create a pixel of any gray level in the receiver.

In the present invention, the term reducing agent includes both silver-salt developers and development precursors, which can react with a silver salt to form the correct density. The reducing agents, as well as their reaction products, can be colored, but are preferably colorless. The diluent can either be an aqueous or organic solvent.

Silver salts which are suitable for use are salts of aliphatic carboxylic acids, for example, silver laurate, silver palmitate, silver stearate, silver oleate, and silver behenate. Suitable organic reducing agents are hydoquinone, catechol, aminophenols, p-phenylenediamines, pyrazolidin-3-one, hydroxytetrone acids, and ascorbic acid. Improved keeping properties, particularly in regard to air oxidation, can be obtained through the use of developer precursors which are "activated" at printing time via reagent mixing in the print head chambers. The activating agents are typically dissolved in a solution. For example, the following hydroquinone precursors are stable to aerial oxidation and become active only when hydrolyzed either by carbonate ion or by a sodium sulfite solution.

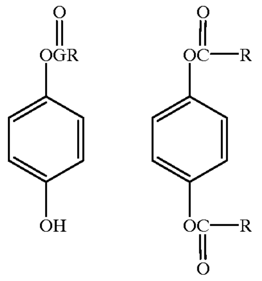

It is understood that the above description is only intended to be an example of many possible chemistries that can be used in the present invention.

FIG. 3 shows a detailed plan view of the mixing chamber of microfluidic printing apparatus in the present invention. FIG. 4 is a cross-sectional view of the mixing chamber as shown in FIG. 3 with closed microvalves. FIG. 5 is a cross-sectional view of the mixing chamber as shown in FIG. 3 with opened microvalves. Each mixing chamber 60 is fabricated in a substrate 280. The substrate can be made of semiconductor such as silicon, glass, or metallic materials. Each mixing chamber 60 is connected to microchannels 240, 250, 260 and 270 for reducing agent, diluent, activating agent, and silver salt, respectively. The microchannels 240, 250, 260 and 270 are each connected to a respective electrokinetic pump which delivers reagents from the corresponding reservoirs 10, 20, 30, 40 (FIG. 1). A microbeam 180, supported by a microbeam support 290, is attached to the micro-shuners for each reagent (such as the micro-shutters 200 and 220 for reducing agent and diluent). The microbeams 180 are attached to piezo plates 190 with each piezo plate 190 controlling the deflection of the corresponding microbeam 180 and thus the opening and closing of the corresponding micro-shutter (200, 220, etc.). In FIG. 4, the micro-shutters are shown in a closed state with the piezo plates 190 inactivated and the microbeams 180 undeflected. In FIG. 5, the piezo plates 190 are activated in a bend mode, the microbeams 180 deflected, and the micro-shutters 200 and 220 are in an open state.

Many other types of microvalves can be used for the present invention. One example is a microvalve comprising a bimetallically driven diaphragm as described in p 26 Sensor, September, 1994. Other types of microvalves are disclosed in U.S. Pat. Nos. 5,178,190; 5,238,223; 5,259,737; 5,367,878; and 5,400,824. Disclosures are also made in above referenced commonly assigned U.S. patent application Ser. No. 08/868,416, filed Jun. 3, 1997, and Ser. No. 08/868,102, filed Jun. 3, 1997.

The typical printing operation in the present invention involves the following steps. First the printer receives a digital image file consisting of electronic signals in which the color code values are characterized by bit depths of an essentially continuous tone image, for example, 8 bits per color per pixel. The color code values at each pixel define the lightness, hue and color saturation at the pixel. In the default non-printing mode, the micro-shutters 200, 220, etc. are closed. This prevents solutions of colorant reactant and colorant precursors from drying up at the outlets of the microchannels. When the printing command is received by the printer, electric activation pulses are sent to bend the piezo plates 190 and deflect the microbeam 180, and open up the microshutters such as 200, 220, etc. for the microchannels 240, 250, 260 and 270. The electrokinetic pumps connected to the corresponding microchannels 240, 250, 260, and 270 around each reacting chamber 60 pump the designated solutions in amounts corresponding to the code values at the pixel from the reservoirs 10, 20, 30, 40 and 80, into the mixing chamber 60. The precise control of the ratios of reagents permits continuous-tone images to be printed on the receiving medium.

After the correct amounts of the reactants and the colorants are delivered, the micro-shutters such as 200 and 220 are closed and the reducing agent reacts with the silver salt in the receiver to form particles of silver metal. The final amounts of silver metal formed correspond to the required density values at the respective pixels in the original image being printed. The mixed solutions comprising the mixture of reducing and activating agents is held in the mixing chamber 60 by the surface tension. A reflective receiver 100 is subsequently placed in contact with the reagent meniscus of the reacting chamber within the printer front plate 120. The mixture contained in the mixing chamber 60 is then transferred to the reflective receiver by capillary-action forces in the pores in the receiver. Since the ink mixture in reacting chamber 60 is shut off from the microchannels connected to the printing apparatus, the amount of the fluid transfer is not sensitive to the contact time. The closed micro-shutters also prevent chemical reactions between the reducing agent and silver salt when the mixing chamber is not activated to print.

The invention has been described in detail with particular reference to certain preferred embodiments thereof, but it will be understood that variations and modifications can be effected within the spirit and scope of the invention.

PARTS LIST

| | |
|---|---|
| 10 | reducing agent reservoir |
| 20 | diluent reservoir |
| 30 | activating agent reservoir |
| 40 | silver salt reservoir |
| 50 | microchannel |
| 60 | mixing chambers |
| 70 | electrokinetic pumps |
| 80 | auxiliary reducing agent reservoir |
| 100 | reflective receiver |
| 110 | microcomputer |
| 115 | transport mechanism |
| 120 | printer front plate |
| 180 | microbeam |
| 190 | piezo plate |
| 200 | micro-shutter for reducing agent |
| 220 | micro-shutter for silver salt |
| 240 | microchannel for reducing agent |
| 250 | microchannel for diluent |
| 260 | microchannel for silver salt |
| 270 | microchannel for activator solution |
| 280 | substrate |
| 290 | microbeam support |

What is claimed is:

1. A method for microfluidic printing of black images on a receiver, comprising the steps of:

a) providing a first reservoir containing a reagent capable of reducing a silver salt to silver metal;

b) providing a second reservoir containing the silver salt;

c) providing a separate microshutter tor the first and second reservoirs and opening the microshutters to cause the reaction of the reducing reagent with the silver salt to produce silver metal which provides black pixels; and d) transferring the black pixels to the receiver.

2. A method for microfluidic printing of black images on a receiver, comprising the steps of:

a) providing a first reservoir containing a reducing reagent;

b) providing a second reservoir containing a silver salt;

c) providing a third reservoir containing a diluent;

d) providing a separate microshutter for the first, second and third reservoirs and opening the microshutters to cause the reaction of the reducing reagent, silver salt, and diluent in amounts which produce silver metal which provides black pixels having a desired density; and e) transferring the black pixels to the receiver.

3. A method for microfluidic printing of black images on a receiver comprising the steps of:

a) providing a first reservoir containing a reducing reagent;

b) providing a second reservoir containing a silver salt;

c) providing a third reservoir containing a solution for activating the reducing reagent;

d) providing a separate microshutter for the first, second, and third reservoirs and opening the microshutters to cause the reaction of the reducing reagent, silver salt, and activating solution in appropriate amounts which produce silver metal which provides black pixels; and e) transferring the black pixels to the receiver.

4. A method for microfluidic printing of black images on a receiver comprising the steps of:

a) providing a first reservoir containing a reducing reagent;

b) providing a second reservoir containing a silver salt;

c) providing a third reservoir containing a solution for activating the reducing reagent;

d) providing a fourth reservoir containing a diluent;

e) providing a separate microshutter for the first, second, third, and fourth reservoirs and opening the microshutters to cause the reaction of the reactants from the reservoirs (steps a–d) which produce silver metal which provides black pixels; and f) transferring the black pixels to the receiver.

5. A method for microfluidic printing of black images on a receiver, comprising the steps of:

a) providing a first reservoir containing a reagent capable of reducing a silver salt to silver metal;

b) providing a second reservoir containing a silver salt;

c) delivering appropriate amounts of silver salt and reducing reagent into a reacting chamber;

d) providing a separate microshutter for the first and second reservoirs and opening the microshutters to cause the reaction of reacting in the reaction chamber the reducing reagent with the silver salt which produce silver metal which provides black pixels, and e) transferring the black pixels to the receiver.

6. A method for microfluidic printing of black images on a receiver, comprising the steps of:

a) providing a first reservoir containing a reducing reagent;

b) providing a second reservoir containing a silver salt;

c) providing a third reservoir containing a diluent;

d) delivering appropriate amounts of the silver salt, reducing reagent, and diluent into a mixing chamber;

e) providing a separate microshutter for the first, second, and third reservoirs and opening the microshutters to cause the reaction of the reactants in the mixing chamber which produce silver metal which provides black pixels of the desired density; and f) transferring the black pixels to the receiver.

* * * * *